(12) United States Patent
Shinohara

(10) Patent No.: US 6,897,898 B1
(45) Date of Patent: May 24, 2005

(54) SOLID STATE IMAGE PICKUP DEVICE

(75) Inventor: Mahito Shinohara, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/265,819

(22) Filed: Mar. 10, 1999

(30) Foreign Application Priority Data

Mar. 12, 1998 (JP) .......................................... 10-061230

(51) Int. Cl.$^7$ .............................................. H04N 5/335
(52) U.S. Cl. ...................................... 348/294; 348/207.1
(58) Field of Search ................................. 348/308, 294, 348/312, 211.14, 211.5, 207.1, 552, 65, 73, 220.1, 207.99, 250

(56) References Cited

U.S. PATENT DOCUMENTS

| 3,872,245 A | * | 3/1975 | Sagawa et al. ............. 358/471 |
| 5,164,832 A | * | 11/1992 | Halvis et al. ................ 348/250 |
| RE34,309 E | | 7/1993 | Tanaka et al. ........... 358/213.31 |
| 5,278,656 A | * | 1/1994 | Hynecek et al. ........ 348/207.99 |
| 5,288,988 A | | 2/1994 | Hashimoto et al. ....... 250/208.1 |
| 5,424,529 A | | 6/1995 | Hashimoto et al. ....... 250/208.1 |
| 5,576,757 A | * | 11/1996 | Roberts et al. ........... 348/220.1 |
| 5,587,738 A | | 12/1996 | Shinohara .................... 348/302 |
| 5,698,844 A | | 12/1997 | Shinohara et al. ....... 250/214 R |
| 5,777,671 A | | 7/1998 | Maki et al. .................. 348/312 |
| 6,130,710 A | * | 10/2000 | Yasuda ..................... 348/220.1 |
| 6,469,736 B1 | * | 10/2002 | Suda ...................... 348/207.99 |
| 2002/0101528 A1 | * | 8/2002 | Lee et al. .................... 348/304 |
| 2002/0167601 A1 | * | 11/2002 | Ohzu et al. ................. 348/243 |

FOREIGN PATENT DOCUMENTS

| JP | A-06-22222 | 1/1994 |
| JP | 703819 A | 1/1995 |
| JP | A-09-284655 | 10/1997 |

* cited by examiner

Primary Examiner—Tuan Ho
Assistant Examiner—Gevell Selby
(74) Attorney, Agent, or Firm—Fitzpatrick, Cella, Harper & Scinto

(57) ABSTRACT

There is provided a solid state image pickup device provided with an image pickup unit containing plural photoelectric conversion elements and a reference clock generation circuit for determining the timing of the drive pulse, wherein the image pickup unit and the reference clock generation circuit are formed in a same semiconductor chip in order to reduce the electric power consumption.

6 Claims, 3 Drawing Sheets

SOLID STATE IMAGE PICKUP DEVICE

BACKGROUND OF THE INVENTION

1. Field of the Invention

The present invention relates to driving control for a solid state image pickup device.

2. Related Background Art

Conventionally there is known a method for driving a solid state image pickup device as shown in FIG. 1, in which there are shown an image sensor chip 1, a drive timing control device 2 such as a microcomputer (hereinafter called microcomputer) for controlling the image sensor chip 1 by outputting driving pulses therefore, drive mode control wirings 3, drive pulse wirings 5, a reference clock wiring 6, a drive pulse generation circuit 21 provided in the image sensor chip 1, and an image pickup unit/peripheral circuit 22 including plural photoelectric converting elements etc. and a peripheral circuit including horizontal and vertical scanning circuits.

FIG. 2 shows another conventional configuration, wherein shown are an image sensor chip 1 including the image pickup unit/peripheral circuit 22 shown in FIG. 1, a drive pulse generation circuit 4, and drive pulse wirings 5. The drive pulse generation circuit 4 is not integrated in an image sensor chip. In FIG. 2, the microcomputer 2, the drive mode control wirings 3, and the reference clock wiring 6 are the same as those in FIG. 1.

In the configuration shown in FIG. 1, the image sensor for outputting the image signal is operated by driving the image pickup unit and peripheral circuit 22 either directly by the drive mode control wirings 3 and the reference clock wiring 6 or by drive pulses generated in a circuit in the image sensor chip based on the drive mode control wirings 3 and the reference clock wiring 6. The configuration shown in FIG. 2 is employed in case requiring drive pulses of a strong driving force, wherein the required drive pulses are generated by the chip of the drive pulse generation circuit 4, based on the drive mode control wirings 3 and the reference clock wiring 6.

In either case, the operation mode of the image sensor chip 1 and the timing thereof are determined by the drive timing controlling device 2 such as the microcomputer, and the microcomputer 2 has to be operated in order to drive the image sensor chip 1.

However such conventional operation of the image sensor chip solely by the external drive causes a drawback in certain situations.

For example, such drawback occurs in a case where the image sensor chip performs a preliminary operation and a main operation, in which the main operation accesses the required image information, and the preliminary operation monitors the projection of the required image onto the image sensor chip. In such process, the main operation starts after the necessary image is projected on the image sensor chip in the preliminary operation, but the preliminary operation may continue for a long period during which the microcomputer 2 and the drive pulse generation circuit 4 have to be continuously operated, so that the consumption of the electric power continues even while the access of the required image information does not take place.

SUMMARY OF THE INVENTION

The object of the present invention is to provide a solid state image pickup device, capable of saving the electric power consumption.

The above-mentioned object can be attained, according to an aspect of the present invention, by a solid state image pickup device in which a reference clock generation circuit for determining the basic timing of the drive pulses for the image pickup unit is formed in a same semiconductor chip as that of the image pickup unit or the drive pulse generation circuit.

According to an another aspect of the present invention, there is provided a solid state image pickup device comprising an image pickup unit including plural photoelectric conversion elements, a drive pulse generation circuit for driving the image pickup unit, a reference pulse generation circuit for determining the timing of the drive pulses, a first control circuit for controlling the operation mode of the drive pulse generation circuit, a second control circuit for controlling the operation mode of the drive pulse generation circuit, and a switch for connecting either the first control circuit or the second control circuit to the drive pulse generation circuit.

Other objects of the present invention, and the features thereof, will become fully apparent from the following description, which is to be taken in conjunction with the attached drawings.

DESCRIPTION OF THE PREFERRED EMBODIMENTS

Figure 1:
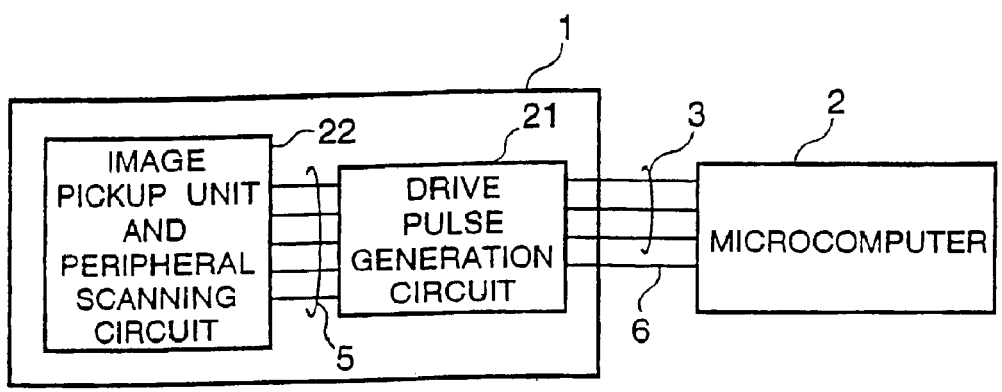
FIGS. 1 and 2 are views showing conventional configurations.
Figure 2:
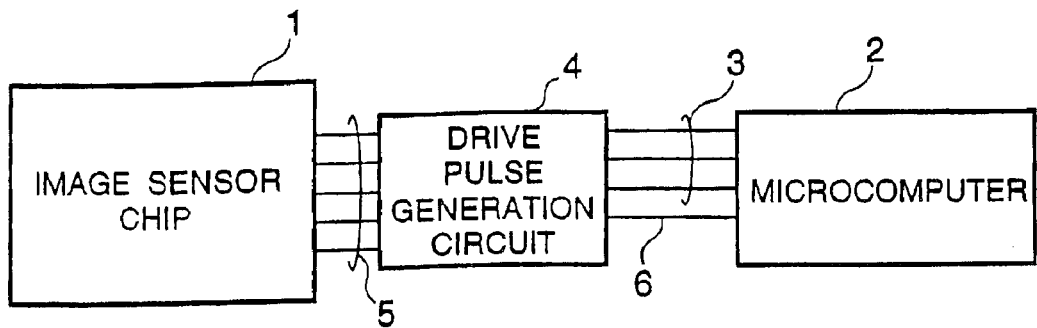
Figure 3:
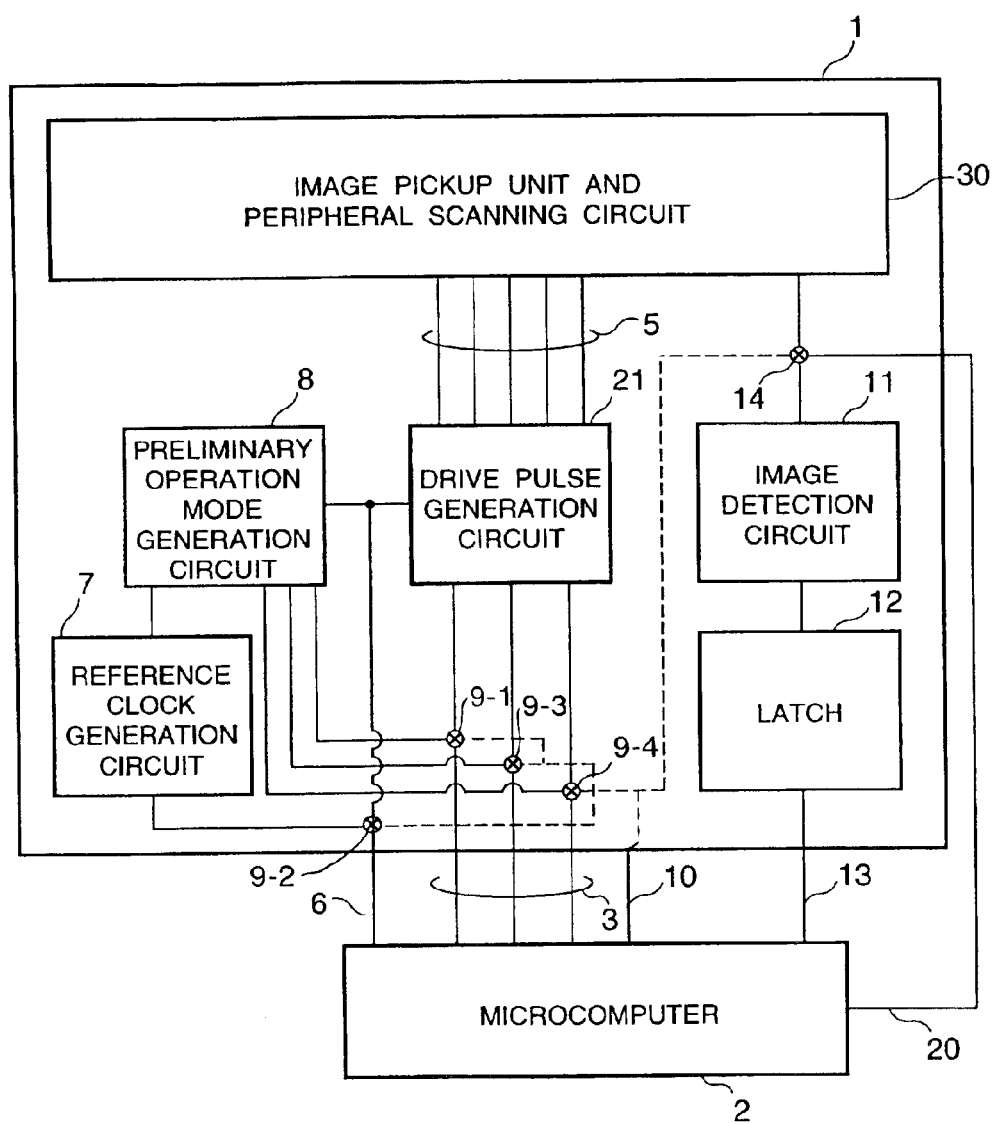
FIG. 3 is a block diagram showing a first embodiment of the present invention.

In the following there will be given a detailed explanation on the first embodiment of the present invention, with reference to the attached drawings. FIG. 3 shows a solid state image pickup device constituting the first embodiment, wherein shown a sensor chip 1 constituted, for example, by a sensor unit 30 including an image pickup unit containing photoelectric conversion elements and peripheral circuits containing horizontal and vertical scanning circuits for reading the charges converted from light by the photoelectric conversion elements, and a drive pulse generation circuit 21; a drive timing control device 2 such as a microcomputer (hereinafter called microcomputer) for controlling the sensor chip 1 by outputting the drive pulses of the main operation mode thereof; drive mode control wirings 3 for the main operation mode from the microcomputer 2; a reference clock wiring 6 for the main operation mode; and drive pulse wirings 5.

There are also shown a reference clock generation circuit 7 for the preliminary operation mode; a preliminary operation mode generation circuit 8 for generating a preliminary operation mode clock signal based on the reference clock signal generated by the reference clock generation circuit 7; switches 9-1 to 9-4 for selecting either the clock signals from the microcomputer 2 or the clock signal of the reference clock generation circuit 7 and the preliminary operation mode generation circuit 8; and an output line 10 from the microcomputer 2 for selecting the states of the switches 9-1 to 9-4. The voltage on the output line 10 is for example at a low level in case the microcomputer 2 is turned off, whereby the switches 9-1 to 9-4 select the outputs of the internal reference clock generation circuit 7 and the preliminary operation mode generation circuit 8, but assumes a high level in case the microcomputer 2 is turned on whereby the switches 9-1 to 9-4 select the pulses of the drive mode control wirings 3 and the reference clock wiring 6 from the microcomputer 2.

There are further provided a detection circuit 11 for detecting whether the output of the sensor unit in the preliminary operation mode contains a necessary image signal, and a latch circuit 12 for latching the output of the detection circuit 11, and the output 13 of the latch circuit 12 is transmitted to the microcomputer 2. A switch 14 transmits the output of the sensor 30 either to the image detection circuit 11 or the microcomputer 2. For example the voltage of the output 13 can be selected as high or low respectively when the image pickup unit fetches or not the necessary image. In such situation, the microcomputer 2 in the off state can be turned on by a shift of the output 13 from the low level to the high level, whereby the operation of the image sensor can shift from the preliminary operation under the control of the reference clock generation circuit 7 and the preliminary operation mode generation circuit 8 to the main operation under the control of the microcomputer 2.

The microcomputer 2 can access the necessary image information exactly from the sensor output 20 in the main operation. A drive pulse generation circuit 21 gives various drive pulses such as drive pulses for horizontal scanning, drive pulses for vertical scanning, and a reset pulse for the image pickup unit etc., to the sensor unit.

In the following there will be explained the operation of the present embodiment.

At first, in the preliminary operation mode, the clock pulses from the preliminary operation mode generation circuit 8 and from the reference clock generation circuit 7 are input, respectively through the switches 9-1 to 9-4 into the drive pulse generation circuit 21. Also the switch 14 switches the sensor output into the detection circuit 11.

Based on the signals from the reference clock generation circuit 7 and the preliminary operation mode generation circuit 8, the drive pulse generation circuit 21 transmits pulses to the horizontal and vertical scanning circuits, thereby reading the signals from the photoelectric conversion elements of the sensor unit 30. The signals read from the sensor unit 30 are entered into the image detection circuit 11, and, if the necessary image is detected, the output 13 of the latch circuit 12 is shifted to a high level state whereby the microcomputer 2 is turned on. At the same time the switches 9-1 to 9-4 are so shifted that the signal from the microcomputer 2 is supplied to the drive pulse generation circuit 21. Also the switch 14 is so shifted that the sensor output is connected to the microcomputer 2.

Based on the control signal from the microcomputer 2, the drive pulse generation circuit 21 sends pulses to the horizontal and vertical scanning circuits, whereby the signals are read from the photoelectric conversion elements of the sensor unit 30. The signals read from the sensor unit 30 are entered into the microcomputer 2 and subjected to image signal processing such as color processing, white balancing etc. to obtain an image signal.

The above-described embodiment reduces wasteful power consumption in the microprocessor, by turning off the microcomputer 2 in the preliminary operation because only a simple signal process is executed, and starting the control by the microcomputer 2 in the main operation in which the image information has to be fetched. The preliminary operation reduces power consumption by operating low-resolution readout, and by performing an intermittent operation, for example every 500 ms. Such intermittent operation can be realized by counting the reference clock signals with a counter.

Specifically, in the preliminary operation, the preliminary operation mode generation circuit 8 generates a drive control signal of the preliminary operation mode based on the reference clock signal generated by the reference clock generation circuit 7 on the image sensor chip, and the drive pulse generation circuit 21 generates drive pulses based on the generated drive control signal to drive the peripheral scanning circuits. The image pickup unit sequentially reads out the image signal corresponding to light received in the preliminary operation mode. In the case that the image detection circuit 11 determines that the sensor receives the necessary image, the latch circuit 12 is latched. This determination may be attained by simple image detection, such as detection of an image signal component whose level is greater than a predetermined level. In the preliminary operation, it is therefore possible in a scanning and read-out operation to reduce the number of the horizontal and vertical scanning lines in image signal reading to a half of that in the main operation mode or to perform the operation intermittently, since the sensor is operated as a monitor to merely determine whether or not the sensor receives the necessary image. The power consumption in this case can be significantly reduced not only in the microcomputer but also in the solid state image pickup device.

Figure 4:
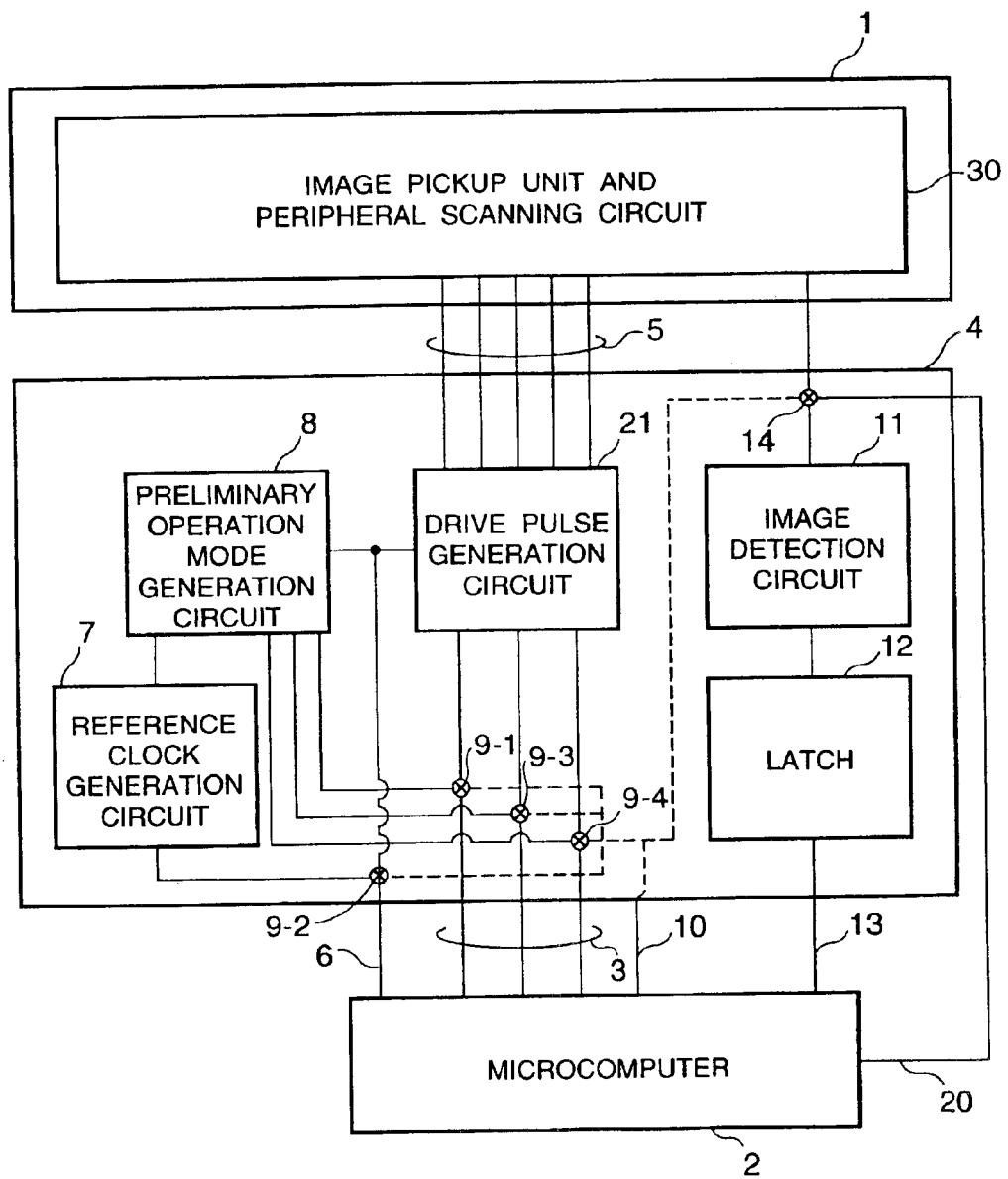
FIG. 4 is a block diagram showing a second embodiment of the present invention.

In the following there will be given a detailed explanation on the second embodiment of the present invention, with reference to the attached drawings. FIG. 4 shows the second embodiment of the present invention. An image sensor chip 1 is driven by a drive pulse generation chip 4. In FIG. 4, the microcomputer 2, drive mode control pulse 3, drive pulse 5, reference clock pulse 6, reference clock generation circuit 7, preliminary operation mode generation circuit 8, switches 9-1 to 9-4, mode switching selection pulse 10, image detection circuit 11, latch 12, image detection discriminating output 13, drive pulse generation circuit 21, and sensor output 20 in the microcomputer control are the same as those shown in FIG. 3 and will not be explained again.

In this configuration, though the entire device is composed of the image sensor chip 1 and the drive pulse generation chip 4, the latter is provided therein with the reference clock generation circuit 7, the preliminary operation mode generation circuit 8 and the switches 9-1 to 9-4, so that, in the preliminary operation, the image pickup unit and the peripheral scanning circuit 30 the image sensor chip 1 are operated in synchronization with the reference clock signal generated in the reference clock generation circuit 7, thereby outputting the image signal to the detection circuit 11 via switch 14.

Also in the main operation, the reference clock pulse 6 and the drive mode control pulse 3 are supplied to the drive pulse generation circuit 21 according to the reference clock signal in the microcomputer 2 to operate the image pickup unit and the peripheral scanning circuit 30 in the image sensor chip 1, thereby outputting the image signal to the sensor output 20.

In the second embodiment shown in FIG. 4, in the preliminary operation, the image sensor chip 1 operates at the timing of the reference clock generation circuit 7 formed in the drive pulse generation chip 4, and the microcomputer 2 remains in the turned-off state.

As in the first embodiment, the control is switched to the microcomputer 2 when it is turned on, thereby suppressing the power consumption of the microcomputer 2 in the preliminary operation and also suppressing the power consumption in the entire device.

As explained in the foregoing, the first and second embodiments allow the selection of the drive mode control for the sensor unit 30 by the external microcomputer 2 or by the reference clock generation circuit 7 and the preliminary operation mode generation circuit 8 formed on the image sensor chip 1 or on the drive pulse generation circuit chip 4, whereby it is rendered possible to suspend the operation of the microcomputer 2 during the preliminary operation mode in which the signal processing by the external microcomputer 2 is not required, thereby suppressing the wasteful power consumption in the microcomputer 2.

Also in the preliminary operation, further suppression of the power consumption is possible since the image pickup unit and the peripheral scanning circuit 30 can be independently operated on the image sensor chip 1 or the drive pulse generation circuit chip 4.

In the foregoing first embodiment, the sensor unit 30, the reference clock generation circuit 7, the drive pulse generation circuit 21 etc. are assumed to be integrated into a single chip, but it is also possible to integrate only the sensor unit 30 and the reference clock generation circuit 7 into a single chip. It is thus possible to change the combination of the circuits to be integrated into a single chip, or to form such circuits as separate components.

Many widely different embodiments of the present invention may be constructed without departing from the spirit and scope of the present invention. It should be understood that the present invention is not limited to the specific embodiments described in the specification, except as defined in the appended claims.

What is claimed is:

1. A sensor chip formed on a single semiconductor chip, comprising:
   an image pickup portion which includes a plurality of photoelectric conversion elements;
   a scan circuit which reads out a signal from said image pickup portion;
   a drive pulse generation circuit which generates a drive pulse for driving said scan circuit;
   a reference clock signal generation circuit which internally generates a first reference clock signal;
   a terminal which externally inputs a second reference clock signal from outside said sensor chip; and
   a switch connected to at least said reference clock signal generation circuit and said terminal, which is driven externally from outside said single semiconductor chip to effect switching between internally driving said image pickup portion and externally driving said image pickup portion.

2. A sensor chip according to claim 1, wherein said drive pulse generation circuit generates a first pulse for driving said scan circuit so as to read out the signal from said image pickup portion in a first mode, and a second pulse for driving said scan circuit so as to read out the signal from said image pickup portion in a second mode, and wherein said sensor chip further comprises a first control circuit which effects control so that said drive pulse generation circuit generates the first pulse, and a terminal which inputs a control signal from outside said semiconductor chip for controlling said drive pulse generation circuit so as to generate the second pulse.

3. A sensor chip according to claim 2, wherein the first mode is a mode for reading out the signal from said image pickup portion at a resolution lower than that of the second mode.

4. A drive pulse generation chip formed on a single semiconductor chip, comprising:
   a drive pulse generation circuit which generates a drive pulse;
   a reference clock signal generation circuit which internally generates a first reference clock signal;
   a terminal which externally inputs a second reference clock signal from the external of said drive pulse generation chip; and
   a switch connected to at least said reference clock signal generation circuit and said terminal, which is driven externally from outside said single semiconductor chip to effect switching between internally driving said drive pulse generation circuit and externally driving said drive pulse generation circuit.

5. A drive pulse generation chip according to claim 4, wherein said drive pulse generation circuit generates a first pulse for a first drive mode and a second pulse for a second drive mode, and
   wherein said drive pulse generation chip further comprises a first control circuit which effects control so that said drive pulse generation circuit generates the first pulse, and a terminal which inputs a control signal from outside said drive pulse generation chip for controlling said drive pulse generation circuit so as to generate the second pulse.

6. An image pickup apparatus comprising:
   a sensor chip formed on a single semiconductor substrate, said sensor chip comprising:
   an image pickup portion which includes a plurality of photoelectric conversion elements;
   a scan circuit which reads out a signal from said image pickup portion;
   a drive pulse generation circuit which generates a drive pulse for driving said scan circuit, said drive pulse generation circuit generating a first pulse for driving said scan circuit so as to read out the signal from said image pickup portion in a first mode, and a second pulse for driving said scan circuit so as to read out the signal from said image pickup portion in a second mode;
   a reference clock signal generation circuit which internally generates a first reference clock signal;
   a terminal which externally inputs a second reference clock signal from outside said semiconductor substrate;
   a first control circuit which effects control so that said drive pulse generation circuit generates the first pulse, wherein said image pickup apparatus further comprises a second control circuit which is provided externally to said single semiconductor substrate and effects control so that said drive pulse generation circuit generates the second pulse; and
   a switch connected to at least said reference clock signal generating circuit and said terminal, which effects switching between internally driving said image pickup portion by said first control circuit and externally driving said image pickup portion by said second control circuit.

* * * * *